(12) United States Patent
Ohba

(10) Patent No.: US 7,243,363 B1
(45) Date of Patent: Jul. 10, 2007

(54) ENTERTAINMENT SYSTEM, PICTURE DISPLAY APPARATUS, INFORMATION PROCESSING APPARATUS AND SYNCHRONIZATION CONTROL METHOD

(75) Inventor: Akio Ohba, Kanagawa (JP)

(73) Assignee: Sony Computer Entertainment, Inc., Tokyo (JP)

( * ) Notice: Subject to any disclaimer, the term of this patent is extended or adjusted under 35 U.S.C. 154(b) by 0 days.

(21) Appl. No.: 09/112,608

(22) Filed: Jul. 9, 1998

(30) Foreign Application Priority Data

Jul. 10, 1997 (JP) ............................... P09-185328

(51) Int. Cl.
*H04N 7/18* (2006.01)

(52) U.S. Cl. .................... 725/80; 725/133; 725/141; 725/153; 463/40; 463/41; 463/42; 463/30; 463/31

(58) Field of Classification Search .............. 725/32, 725/36, 54, 71, 80, 105, 133, 141, 153; 348/500, 348/512, 521, 522, 588, 706, 159; 463/40–42, 463/30–31; 709/248
See application file for complete search history.

(56) References Cited

U.S. PATENT DOCUMENTS

| | | | | |
|---|---|---|---|---|
| 4,521,014 A | * | 6/1985 | Sitrick ........................ | 463/31 |
| 4,570,930 A | * | 2/1986 | Matheson ................. | 379/93.13 |
| 4,572,509 A | * | 2/1986 | Sitrick ........................ | 463/31 |
| 4,684,938 A | * | 8/1987 | Chauvel ...................... | 345/440 |
| 4,998,199 A | * | 3/1991 | Tashiro et al. ................ | 463/29 |
| 5,083,800 A | * | 1/1992 | Lockton ....................... | 463/42 |
| 5,350,176 A | * | 9/1994 | Hochstein et al. .......... | 273/364 |
| 5,423,555 A | * | 6/1995 | Kidrin ...................... | 273/148 B |
| 5,547,202 A | * | 8/1996 | Tsumura ...................... | 463/29 |
| 5,553,864 A | * | 9/1996 | Sitrick ......................... | 463/31 |
| 5,586,937 A | * | 12/1996 | Menashe ..................... | 463/41 |
| 5,595,389 A | * | 1/1997 | Parulski et al. ............... | 463/31 |
| 5,624,316 A | * | 4/1997 | Roskowski et al. .......... | 463/45 |
| 5,641,319 A | * | 6/1997 | Stoel et al. .................. | 345/2.1 |
| 5,643,088 A | * | 7/1997 | Vaughn et al. ................ | 463/40 |
| 5,685,775 A | * | 11/1997 | Bakoglu et al. .............. | 463/41 |
| 5,813,913 A | * | 9/1998 | Berner et al. ................. | 463/40 |
| 5,820,463 A | * | 10/1998 | O'Callaghan ................ | 463/42 |
| 5,830,065 A | * | 11/1998 | Sitrick ......................... | 463/31 |
| 5,882,262 A | * | 3/1999 | Ballhorn ...................... | 463/43 |
| 5,914,940 A | * | 6/1999 | Fukuoka et al. ......... | 348/423.1 |
| 5,917,725 A | * | 6/1999 | Thacher et al. ............... | 700/91 |

(Continued)

FOREIGN PATENT DOCUMENTS

JP          01-191518          8/1989

(Continued)

*Primary Examiner*—Jason Salce
(74) *Attorney, Agent, or Firm*—Fulwider Patton LLP

(57) ABSTRACT

An entertainment system comprised of plural game playing machines interconnected over a communication channel in which the pictures generated and displayed in the game playing machines are synchronized with external synchronization signals. In performing real-time information processing, such as a combat game, as the status change information is exchanged over a communication cable 82, game playing machines A and B enter synchronization signals transmitted from the game playing machine B via communication cable 92 to an external synchronization information input terminal 50*a* of a CRTC 34*a* of the game playing machine A. Picture signals are generated in the game playing machines A and B and pictures synchronized between the game playing machines A and B are displayed in the game playing machines 10*a*, 10*b*.

6 Claims, 17 Drawing Sheets

U.S. PATENT DOCUMENTS

| | | | | |
|---|---|---|---|---|
| 5,917,830 A | * | 6/1999 | Chen et al. | 348/473 |
| 5,974,442 A | * | 10/1999 | Adams | 709/200 |
| 5,995,146 A | * | 11/1999 | Rasmussen | 375/240.01 |
| 6,015,348 A | * | 1/2000 | Lambright et al. | 463/42 |
| 6,040,871 A | * | 3/2000 | Andersson | 348/441 |
| 6,042,476 A | * | 3/2000 | Ohashi et al. | 463/40 |
| 6,042,477 A | * | 3/2000 | Addink | 463/42 |
| 6,061,532 A | * | 5/2000 | Bell | 396/661 |
| 6,061,722 A | * | 5/2000 | Lipa et al. | 709/224 |
| 6,074,300 A | * | 6/2000 | Hirano et al. | 463/43 |
| 6,080,063 A | * | 6/2000 | Khosla | 463/42 |
| 6,089,982 A | * | 7/2000 | Holch et al. | 463/42 |
| 6,183,364 B1 | * | 2/2001 | Trovato | 463/32 |

FOREIGN PATENT DOCUMENTS

| | | |
|---|---|---|
| JP | 02-041190 | 2/1990 |
| JP | 06-284339 | 10/1994 |
| JP | 07-088250 | 4/1995 |
| JP | 07-213744 | 8/1995 |
| JP | 08-024440 | 1/1996 |
| JP | 08-137428 | 5/1996 |
| JP | 08-206361 | 8/1996 |
| JP | 08-243255 | 9/1996 |
| JP | 0 756 255 A2 * | 1/1997 |
| JP | 09-065231 | 3/1997 |
| JP | 09-093550 | 4/1997 |
| JP | 09-098388 | 4/1997 |
| JP | 09-113191 | 5/1997 |
| JP | 09-140937 | 6/1997 |

* cited by examiner

ENTERTAINMENT SYSTEM, PICTURE DISPLAY APPARATUS, INFORMATION PROCESSING APPARATUS AND SYNCHRONIZATION CONTROL METHOD

BACKGROUND OF THE INVENTION

1. Field of the Invention

This invention relates to an entertainment system comprised of plural entertainment devices interconnected via a communication channel, such as a telephone network, a picture display apparatus for outputting picture signals to a display unit in synchronism with external synchronization signals, an information processing apparatus for interconnecting plural information equipments having the above picture display apparatus via a communication network for transmitting data, and a synchronization controlling method for synchronizing plural picture signals and outputting the synchronized picture signals to the display unit.

2. Description of Related Art

It is currently practiced to interconnect information equipments, such as computer game playing machines, adapted for generating picture signals based on an application program for displaying the generated signal on a display apparatus, over radio or wired communication networks, in order to process the information in real-time under exchanging data.

FIG. 1 shows the structure of a conventional game playing machine in which two game playing machines are interconnected over a communication cable in order to have a 1:1 combat game. This structure is used when the two game playing machines are in extremely close proximity to each other, as in home.

A game playing machine 81a (game playing machine A) and a game playing machine 81b (game playing machine B), interconnected over a communication cable (serial cable) 82, are provided with CRT controllers (CRTCs) 34a, 34b operating as display control means. These game playing machines 81a, 81b generate pictures based on the operating information of a controller connected to an own machine or on game process change data (status change information) indicating changes in the game progressing state. The game playing machines 81a, 81b also generate a picture based on operational data sent from other than the own machine. These pictures are collected by the CRTCs 34a, 34b to respective sole picture signals (video-out-A, video-out-B) which are outputted to respective display units 10a, 10b of the game playing machines 81a, 81b.

FIG. 2 shows the structure of a conventional game playing apparatus in which three or more game playing machines are interconnected via a communication cable to carry out a game by a large number of participants. Similarly to the structure of FIG. 1, this structure is used in case the game playing machines are in close proximity to one another.

In FIG. 2, only three game playing machines 81a, 81b, 81c (game playing machines A, B and C) are shown. However, this number is merely illustrative and can be increased or decreased in desired manner. The communication cables (serial cables) 82a, 82b, 82c, ... connected to the game playing machines are interconnected to a multi-tap 88 for relaying data transferred between the game playing machines.

The game playing machines interconnected by the communication cables 82a to 82c generate a picture based on operating data of the controller connected to the own machine, while also generating pictures based on game process change data (status change information) supplied form other than the own machine. These pictures are outputted as sole output picture signal (video-out-A, video-out-B and video-out-C) to display devices 10a, 10b, 10c.

The structure in which plural game playing machines are remote from one another and in which a game is played as data such as game process change data are exchanged via communication network such as a telephone network.

FIG. 3 shows a structure of a conventional game playing apparatus in which two game playing machines, that is a game playing machine 81a (game playing machine A) and a game playing machine 81b (game playing machine B) are interconnected by a telephone network 82 in order to play a 1:1 combat game. This structure, similar to the structure of the game playing apparatus shown in FIG. 1, differs therefrom in that communication modems 83a, 83b are arranged for exchanging data over a telephone network 82. The parts or components similar to those described above are depicted by the same reference numerals.

FIG. 4 shows a structure in which three or more game playing machines are interconnected via telephone network 82a, 82b, 82c, ... to have a play for many participants. Although this structure is similar to that of the game playing machine shown in FIG. 2, the telephone network 82a, 82b, 82c connected to the respective game playing machines are connected to a host station 89 operating for relaying the data transferred between the respective game playing machines.

In the above-described structure, there is produced delay (latency) in transmission time since data such as game process change data transmitted via telephone network 82 are sent via communication modems 83a, 83b, 83c. Thus, it has not been possible to synchronize picture signals (video-out-A, video-out-B, video-out-C) displayed on the display units 10a, 10b, 10c of the game playing machines.

For example, if two players A, B execute an "auto racing game", a car B operated by a player B is displayed on the screen of the game playing machine of the player A in addition to a car B operated by the player B. Similarly, the car A operated by the player A is displayed on the screen of the game playing machine of the player B in addition to a car B operated by the player B.

Since data such as game process change data for displaying the car B as the counterpart of combat on a screen of the game playing machine of the player A are transmitted via communication modem via telephone network, these data are delayed with respect to data such as game process change data for displaying the car A on the screen of the game playing machine of the player A. This applies for the side of the player B.

Therefore, if the player operates the car A as he or she views the car B of the counterpart of combat displayed on the game playing machine of the player A, correct game results cannot be obtained.

The above-described problem arises since the CRTC as display control means for controlling picture signals displayed on a display device usually does not have the external synchronization function of retrieving external synchronization signals to effect synchronization control, such that synchronization control cannot be realized even if synchronization signals are entered along with data such as game process change data.

These information equipments operate on the basis of respective time information (clocks). For information processing in real-time as data are exchanged over communication networks between respective information equipments, reset signals are first exchanged to reset the clocks. However, since the clock speeds differ from equipment to equipment, if slightly, and are changed with time, the speeds of execution of the respective information equipments drift gradually such that there arises a problem that picture signals generated by an information equipment and displayed on the display unit are not in agreement with those generated by data such as game process change data sent from another information equipment and displayed on the display unit.

Of course, if the updating interval of pictures displayed on the dis-play apparatus is shortened, the above drift can be reduced. However, if desired to generate picture signals in real-time using data such as game process change data from outside and to display the generated data, it is necessary to transfer data of large capacity such as game process change data in the face of considerable difficulties.

Thus, with the conventional picture display apparatus and the information processing apparatus employing these display apparatus, it has not been possible to execute information processing in need of high temporal accuracy by employing data such as game process change data transmitted via communication modem.

SUMMARY OF THE INVENTION

It is therefore an object of the present invention to provide an entertainment system, a picture processing apparatus, an information processing apparatus and a synchronization controlling method for synchronizing the synchronization signals whereby picture signals generated on the basis of the status change information such as game process change data exchanged between plural information equipments or entertainment devices interconnected over communication networks can be synchronized and displayed on the display unit.

In one aspect, the present invention provides an entertainment system in which plural entertainment devices are interconnected via a communication channel, wherein the plural entertainment devices are interconnected via a synchronization signal transmission channel and a status change information transmission channel and wherein at least one of the entertainment devices generates picture signals in synchronism with the synchronization signals transmitted via the synchronization signal transmission channel based on the status change information of the own machine and the status change information sent from other than the own machine via the status change information transmission channel.

In another aspect, the present invention provides a picture display apparatus for displaying picture signals on a display unit including a memory in which are recorded plural picture data, display control means including a synchronization information input terminal to which is entered the synchronization information from outside, and having the function of outputting picture signals by picture data written in the memory in synchronism with the synchronization information from outside and a picture output terminal for outputting the picture signals to outside.

In still another aspect, the present invention provides a picture processing apparatus in which picture display devices for picture signals on a display unit are interconnected over a communication network, including a first picture display device having a memory in which are written plural picture data, display control means for outputting picture signals by picture data written in the memory and a picture output terminal for outputting the picture data to outside; and a second picture display device having a memory in which are written plural picture data and display control means including a picture input terminal to which are entered picture data from other picture display means via the communication network. The display control means has the function of outputting picture signals by the picture data written in the memory in synchronism with the synchronization information for the input picture data.

In yet another aspect, the present invention provides a synchronization processing method for outputting picture signals displayed on each display unit of an information processing apparatus having a plurality of picture display units interconnected by a communication network, in synchronism with synchronization signals from outside, including a memory writing step of writing plural picture data in a memory, a synchronization controlling step of synchronizing picture signals by picture data written in the memory with the synchronization information entered from outside and a picture outputting step of outputting the picture signals.

In the information equipments interconnected via a communication network, pictures can be generated on the basis of the status change information, such as gape process change data, sent from other information equipments, and displayed on a display unit in synchronism with the synchronization signals.

Since the CRTC operating as a display control unit having the external synchronization function is used, plural information equipments can be operated in synchronism on the picture signal level, thus easily realizing real-time information processing controlled in terms of a one field (1/60 sec) or one frame (1/30 sec) as unit.

In particular, since each information equipment uses the synchronization information, such as that of telecast signals, as the common time information, the pictures displayed on the display unit in each information equipment can be synchronized when the status change information such as game process change data is transmitted between the information equipments via communication modem over a telephone network, thus enabling information processing by real-time communication by plural participants.

DESCRIPTION OF THE PREFERRED EMBODIMENTS

Figure 1:
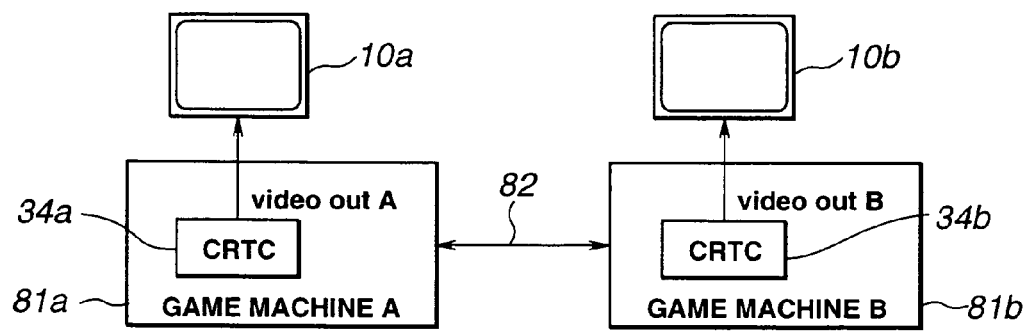
FIG. 1 shows an example of a conventional entertainment system in which two game playing machines are interconnected over a communication cable to conduct a 1:1 combat game.

Referring to the drawings, preferred embodiments of the present invention will be explained in detail. First, a preferred embodiment of the picture display apparatus used in an entertainment apparatus of an entertainment system of the present invention is explained, and an embodiment of the information processing apparatus of the present invention constructed by interconnecting plural information equipments each provided with the picture display apparatus, is then explained. Then, an embodiment of the synchronization controlling method of the present invention is explained while reference is had to an example of the structure of the information processing apparatus of the present invention.

Figure 5:
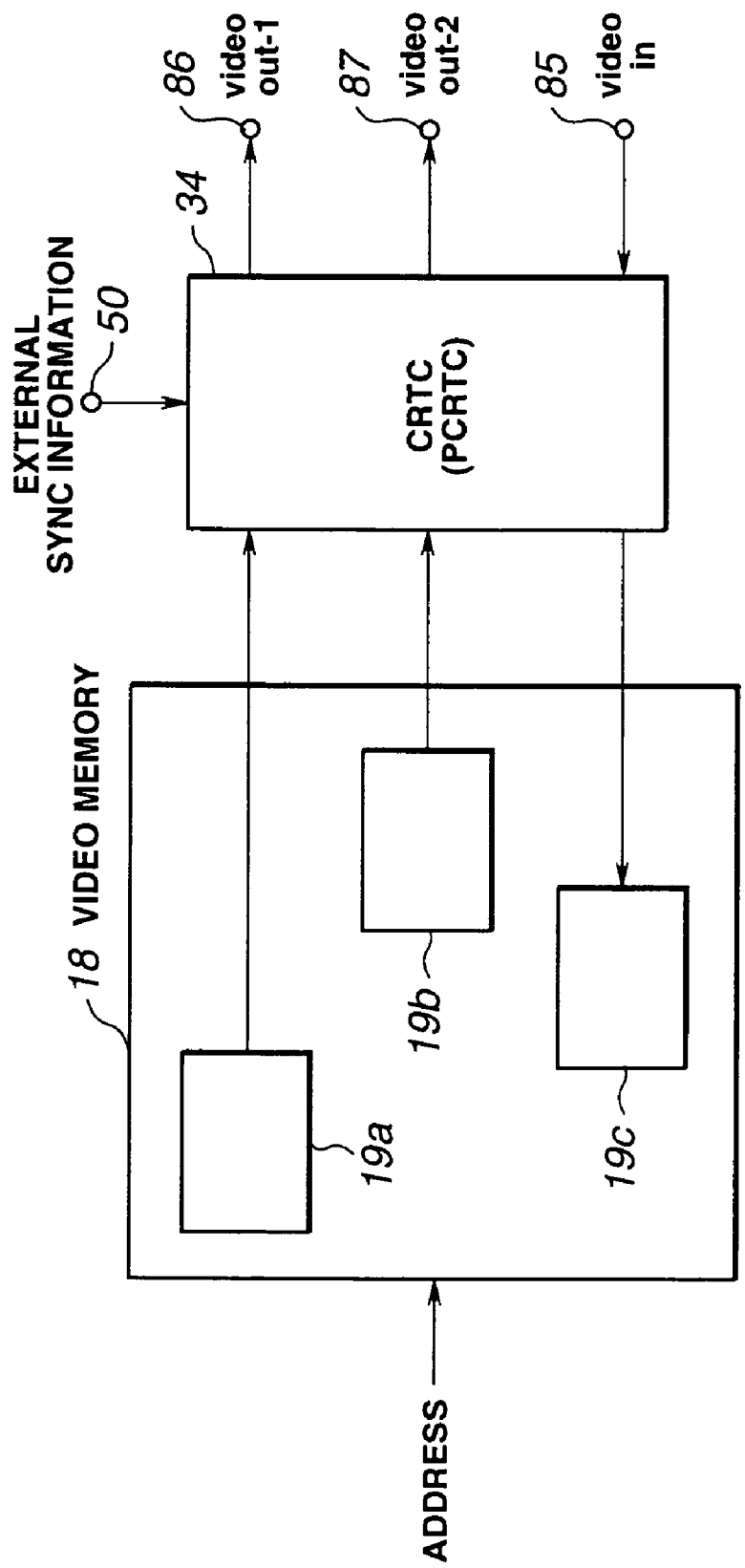
FIG. 5 is a block diagram showing a basic structure of essential portions of a picture display apparatus embodying the present invention.

FIG. 5 shows a block diagram showing the basic structure of essential parts of the embodiment of the picture display apparatus having a video memory and a CRT controller (CRTC).

A video memory 18, capable of storing plural picture data, is a frame memory for storing picture data on the frame basis. The picture data stored in the video memory 18 are read out based on addresses as later explained.

The CRT controller (CRTC) 34 is display control means for outputting picture data 19a, 19b, 19c stored in the video memory 18 to a display apparatus as picture signals responsive to synchronization signals, that is synchronization signals. Although the above display unit is termed the CRT controller (CRTC), the display apparatus outputting picture signals are not limited to the cathode ray tube (CRT).

This CRTC 34 has the external synchronization function, such that, if external synchronization information, that is synchronization signals, are entered at an external synchronization information input terminal 50, the CRTC is synchronized therewith to output the picture data 19a as a picture signal video-out-1 at a picture output terminal 86.

The CRTC 34 can independently output desired picture data of plural picture data stored in the video memory 18 as picture signals. To this end, the CRTC 34 has plural picture output terminals and can output to a picture output terminal 87 picture signals video-out-2, obtained on reading out the picture data 19b, independently of the above-mentioned picture signal video-out-1. Meanwhile, the CRTC 34 can also synthesize plural picture data to output the resulting sole picture signal, or synchronize picture signals outputted at plural picture output terminals.

The CRTC 34 also has a picture input terminal 85 and can retrieve an optional position portion, an optional size portion or the full picture data 19c of picture signals video-in entered in synchronism with synchronization signals in the video memory 18 for storage therein.

Although FIG. 5 shows the case of storing three picture data 19a, 19b, 19c in the video memory 18, any optional number of picture data can be stored in the video memory 18. Also, a plurality of picture output auxiliary terminals 87 may be provided for independently outputting picture data stored in the video memory 18 as picture signals.

Figure 6:
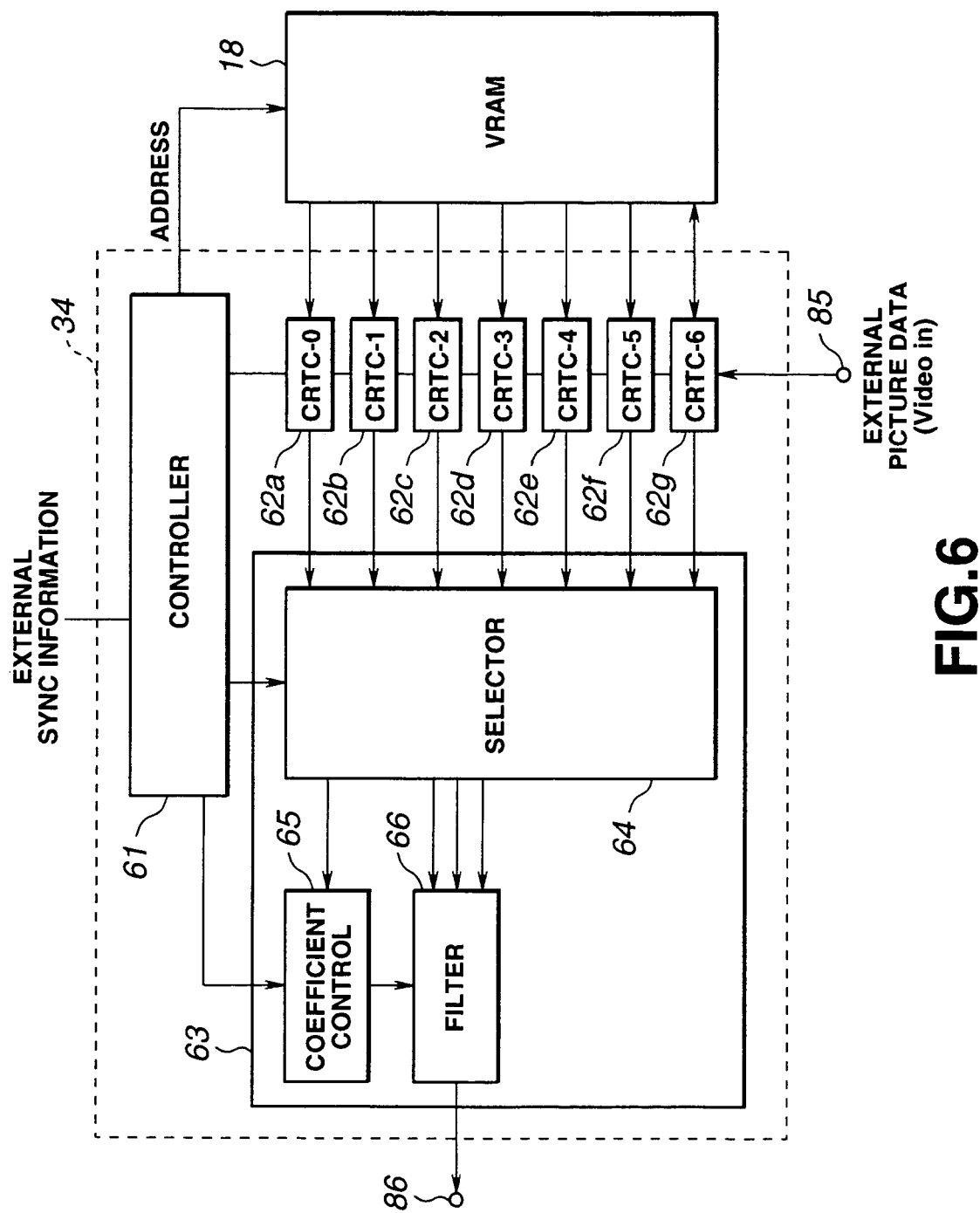
FIG. 6 is a block diagram showing an illustrative structure of a CRT controller (CRTC).

FIG. 6 is a block diagram showing an example of the structure of the above-mentioned CRT controller (CRTC). In the following description, parts or components similar to those described above are indicated by the same reference numerals.

The CRTC 34 is made up of a controller 61, plural CRTC buffers 62a to 62g and a selective synthesis unit 63. This CRTC 34 has plural buffers (CRTC buffers) for displaying plural pictures on the same screen of the display unit and also can independently control the CRTC buffers.

The controller 61 counts a pre-set number of synchronization signals to set a desired data slicing position. The CRTC 34 generates an address for slicing desired picture data to send the generated address to the VRAM 18.

The CRTC whose controller 61 is adapted to operate in accordance with the control program is termed a programmable CRTC (PCRTC).

In the VRAM 18 are written picture data displayed in one frame, so that, each time an address is supplied from the controller 61, picture data specified by the address is read out and sent to CRTC buffers 62a to 62g. Meanwhile, the VRAM 18 is adapted to read out picture data supplied from outside via CRTC buffer 62g in accordance with the address from the controller 61.

The CRTC buffer 62 is made up of plural CRTC buffers 62a to 62g and is fed with different picture data at each CRTC buffers 62a to 62g to transiently store the supplied picture data. The CRTC buffers 62a to 62g are independently controller by the controller 61 to sequentially supply the picture data to a selective synthesis unit 63 from one horizontal scanning line to another.

Of the CRTC buffers 62, the CRTC buffer 62g, for example, has the bidirectional function. That is, the CRTC buffer 62g can retrieve external picture data video-in, supplied from a picture input terminal 85, to send the retrieved picture data to the VRAM 18. If fed with an address from the controller 61, the VRAM 18 can read out retrieved picture data, as it can read out other picture data. The read-out picture data are sent via CRTC buffer 62g to the selective synthesis unit 63.

It is possible for plural picture data written in the video memory (VRAM) 18 to have different values of resolution.

The selective synthesis unit 63 has a selector 64 for selecting supplied picture data, a coefficient control circuit 65, and a filter 66. The respective picture data are supplied via CRTC buffers 62a to 62g to the selector 64.

The selector 64 selects supplied picture data, under control by the controller 61, to send only pre-set picture data to the filter 66.

When fed with pre-set picture data from the selector 64, the coefficient control circuit 65 partially modifies parameters of picture data or multiplies part or all of parameters of picture data with α-values representing opacity of an object, based on the calculated results of the controller 61, by way of processing picture data supplied to the filter 66.

The filter 66 synthesizes the supplied picture data to output synthesized picture data at the picture output terminal 86.

The outputted picture synthesis data is converted into analog data by a D/A converter. The converted analog picture signals can be displayed as plural pictures on a sole display screen.

A synthesis unit executing product sum processing may be used in place of the selector 64.

An embodiment of an information processing apparatus or an entertainment system, constituted by interconnecting entertainment devices, such as game playing machines, as plural information equipments, each having a picture display apparatus embodying the present invention, is hereinafter explained. In the following description, it is assumed that the above information equipment is a game playing machine or an entertainment device.

Figure 7:
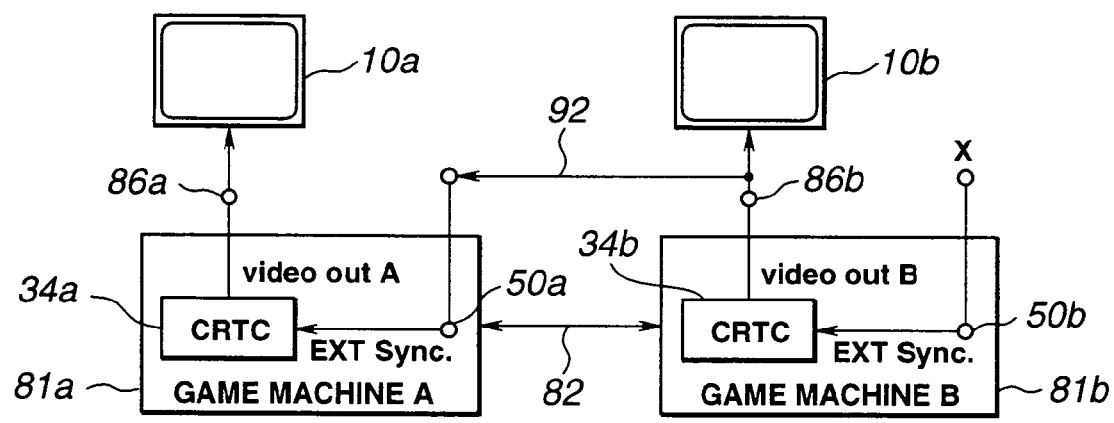
FIG. 7 shows an example of an entertainment system having an interconnecting communication cable to play a 1:1 combat game.

FIG. 7 shows a configuration in which two game playing machines (entertainment devices) placed in close proximity to each other are interconnected by a communication cable in order to conduct a 1:1 combat game. In FIG. 7, the video memory is omitted from the drawing.

The game playing machine 81a (game playing machine A) and the game playing machine (game playing machine B) are provided with the above-mentioned CRTCs 34a, 34b, respectively. The CRTCs 34a, 34b are provided with external synchronization information input terminals 50a, 50b, respectively, and output picture signals video-out-A, video-out-B, respectively, in response to external synchronization signals EXT Sync at display units 10a, 10b, respectively.

In this game playing machine, operating commands, speech, pictures, game process change data, such as changes in the game process, that is status change information, are exchanged between the game playing machines A (81a) and B(81b), via communication cables 82, such as communication network, as status change information transmission channel. Picture signals are generated based on this status change information. Of the picture signals from the picture output terminal 86b of the CRTC 34b of the game playing machine B, at least the synchronization signal components are sent via communication cables 92 as synchronization signal transmission channel to an external synchronization information input terminal 50a of the CRTC 34a of the game playing machine A.

In the game playing machine A (81a), an output of picture signals from the CRTC 34a is controlled to be synchronized with synchronization signals from the external synchronization information input terminal 50a of the CRTC 34a of the game playing machine A. To this end, it suffices if picture data readout via CRTC from the above-mentioned video memory via CRTC is synchronized with the above-mentioned external synchronization information. Alternatively, picture generation by the game program or the like may be synchronized with the external synchronization signals.

Since the external synchronization information is not supplied to an external synchronization information input terminal 50b, the CRTC 34b of the game playing machine B outputs the picture signal video-out-B at the picture output terminal 86b in accordance with the time information from the enclosed clocks.

There are contained synchronization signals in the picture signals video-out-B outputted at a picture output terminal 86b. The game playing machine. A operates in synchronism with the game playing machine B by sending these synchronization signals to the external synchronization information input terminal 50a of the CRTC 34a of the game playing machine A.

The communication cables 82, 92 are usually serial cables. However, the communication cables may be replaced by local area network (LAN).

Figure 8:
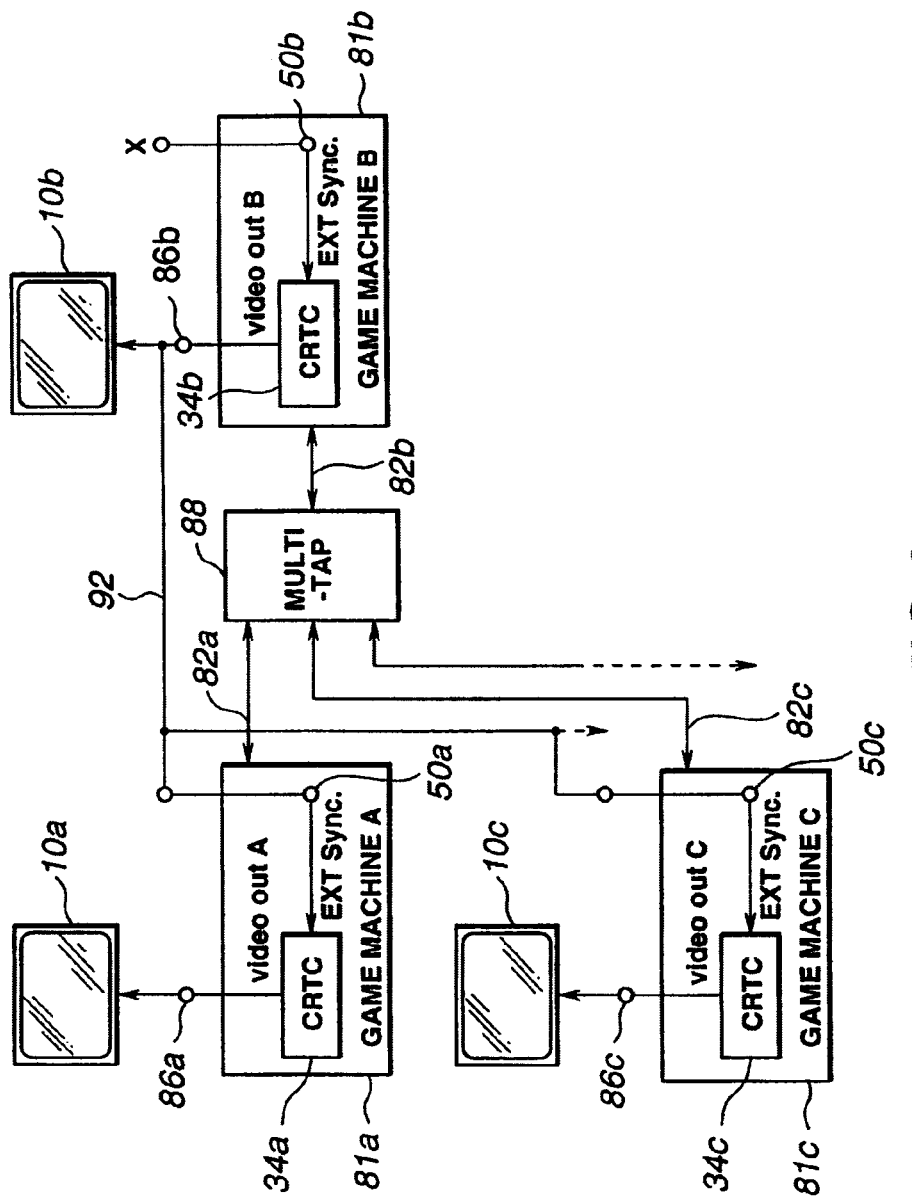
FIG. 8 shows an example of an entertainment system having an interconnecting communication cable to play a 1:1 combat game.

With reference to FIG. 8, the game playing machine 81a (game playing machine A), game playing machine 81b (game playing machine B) and the game playing machine 81c (game playing machine C) are connected over communication cables 82a, 82b, 82c to a multi-tap 88. The multi-tap 88 is used for relaying picture data exchanged between the game playing machines.

In this game playing apparatus (entertainment system), the game playing machines A and C are adapted to operate in synchronism with synchronization signals sent from the game playing machine B over the communication network 92.

Figure 2:
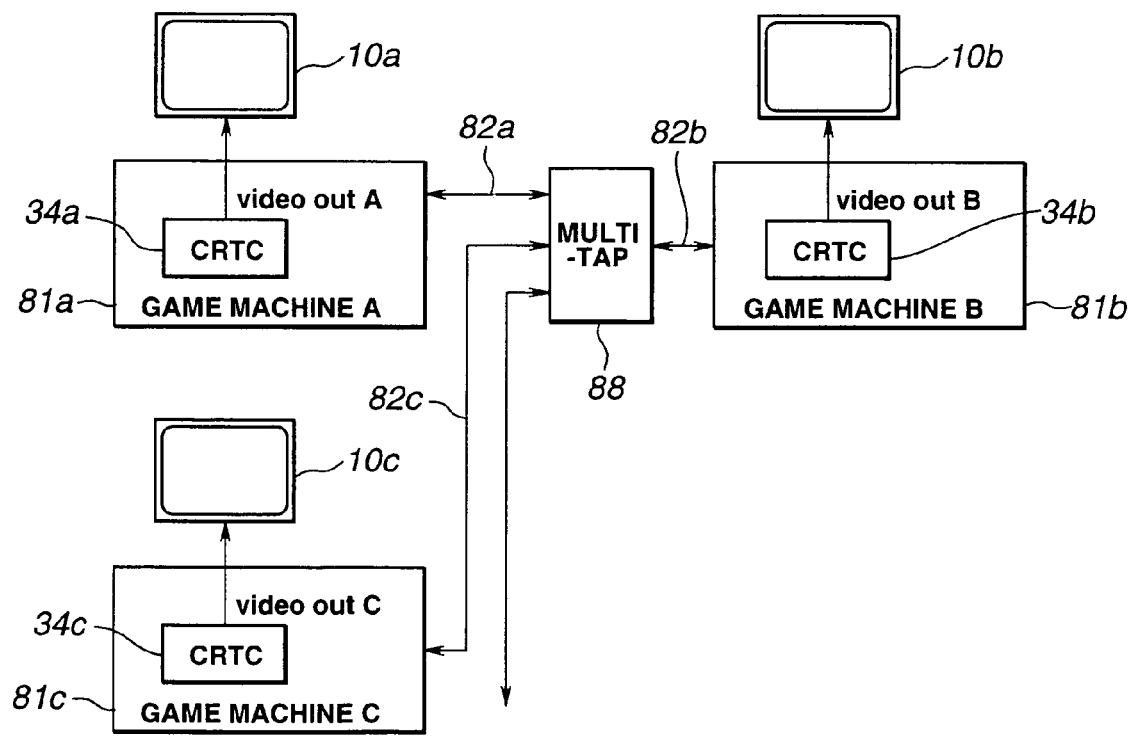
FIG. 2 shows an example of a conventional entertainment system in which three or more game playing machines are interconnected over a communication cable to conduct a combat game by plural participants.

The illustrative structure of the game playing apparatus of FIGS. 7 and 8 is similar to that of the conventional game playing apparatus shown in FIGS. 1 and 2, except that the CRTCs 34a, 34b and 34c of the game playing machines are provided with synchronization information input terminals 50a, 50b, 50c fed with the synchronization information from outside (EXT. Sync). The game playing apparatus of FIGS. 7 and 8 has characteristics that one of the plural game playing machines transmit synchronization signals, with the remaining game playing machines operating in synchronism with the synchronization signals. This enables the respective game playing machines to display the picture signals video-out-A, video-out-B and video-out-C, generated on the basis of the exchanged status change information, on the display units 10a, 10b, 10c in synchronism with the synchronization signals from the game playing machine B.

The illustrative structure of FIG. 8 is otherwise the same as the above-described structure shown in FIG. 7 and hence the corresponding parts or components, e.g., 86a, 86b, 86c, are depicted by the same reference numerals and are not specifically explained.

Next, an illustrative structure of a game playing apparatus (entertainment system) in which plural game playing machines are at remote places from each other, the game is conducted as the status change information such as game process change data is exchanged over the communication networks and in which synchronization signals are furnished by a satellite, is explained.

Figure 9:
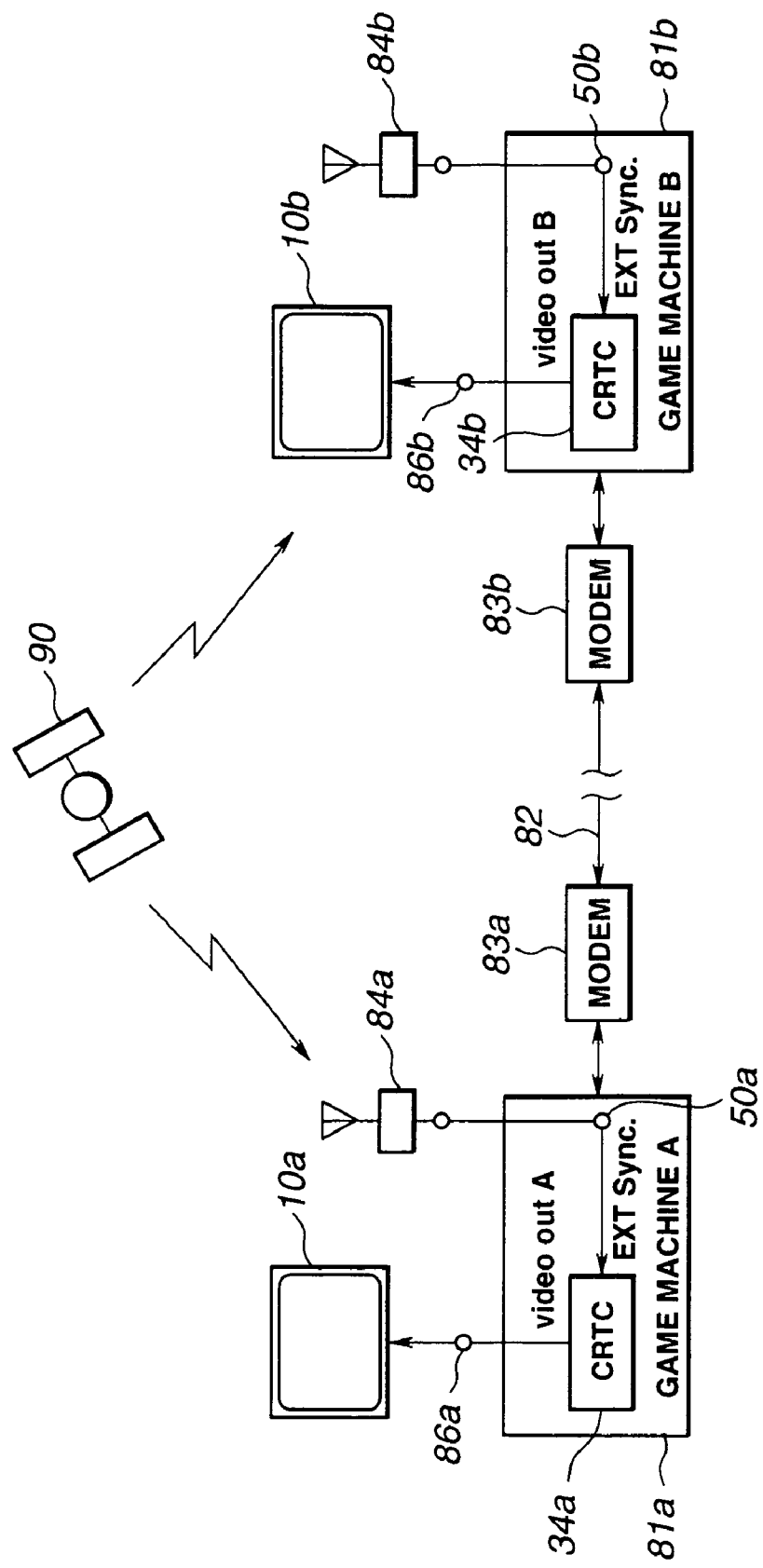
FIG. 9 shows an example of an entertainment system having an interconnecting telephone network to conduct a 1:1 combat game.

FIG. 9 shows an illustrative structure in which two game playing machines, that is a game playing machine 81a (game playing machine A) and a game playing machine 81b (game playing machine B), are interconnected over a communication cable 82, such as a telephone network, for transmitting at least the status change information in order to conduct a 1:1 combat game. Each game playing machine is fed with at least synchronization signals from a satellite 90.

Figure 10:
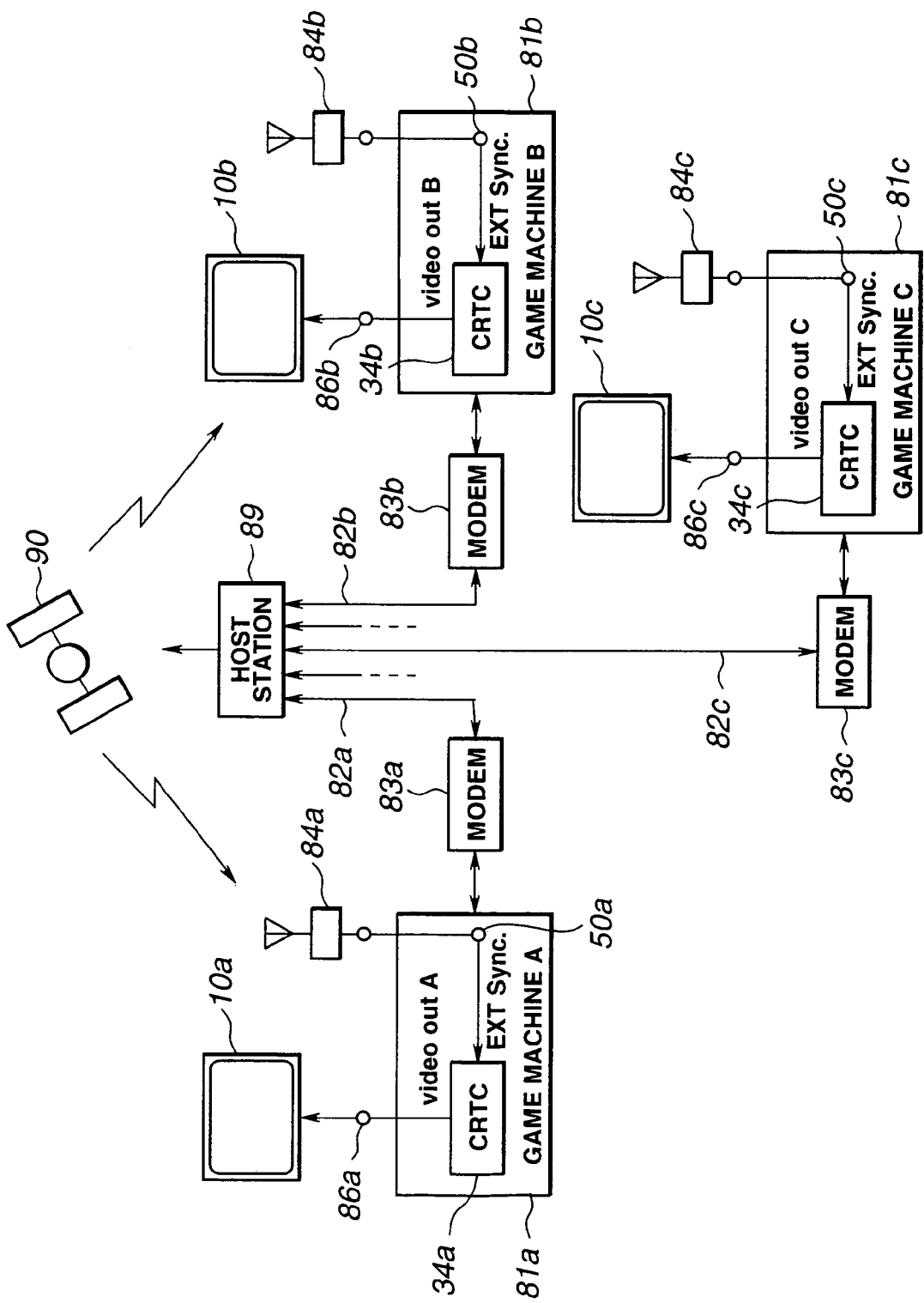
FIG. 10 shows an example of an entertainment system having an interconnecting telephone network to conduct a real-time game by plural participants.

FIG. 10 shows an illustrative structure in which three or more game playing machines, that is a game playing machine 81*a* (game playing machine A), a game playing machine 81*b* (game playing machine B) and a game playing machine 81*c* (game playing machine C) are interconnected over communication cable 82*a*, 82*b*, 82*c*, such as telephone networks, for transmitting at least the status change information, in order to hold a real-time game by plural participants. Each game playing machine is fed with at least synchronization signals from a satellite 90.

Although FIG. 6 illustrates an entertainment system constituted by three game playing machines, the number of the game playing machines can be increased or decreased in a desired manner.

In FIG. 10, the game playing machine 81*a* (game playing machine A), game playing machine 81*b* (game playing machine B) and the game playing machine 81*c* (game playing machine C) are connected to the host station 89 via communication cables 82*a*, 82*b*, 82*c*, such as telephone networks, adapted for transmitting at least the status change information.

The host station 89 is used for controlling the game playing machines and for relaying the status change information, such as game process change data, exchanged between the game playing machines. The host station 89 also has the function of controlling the satellite 90.

Figure 3:
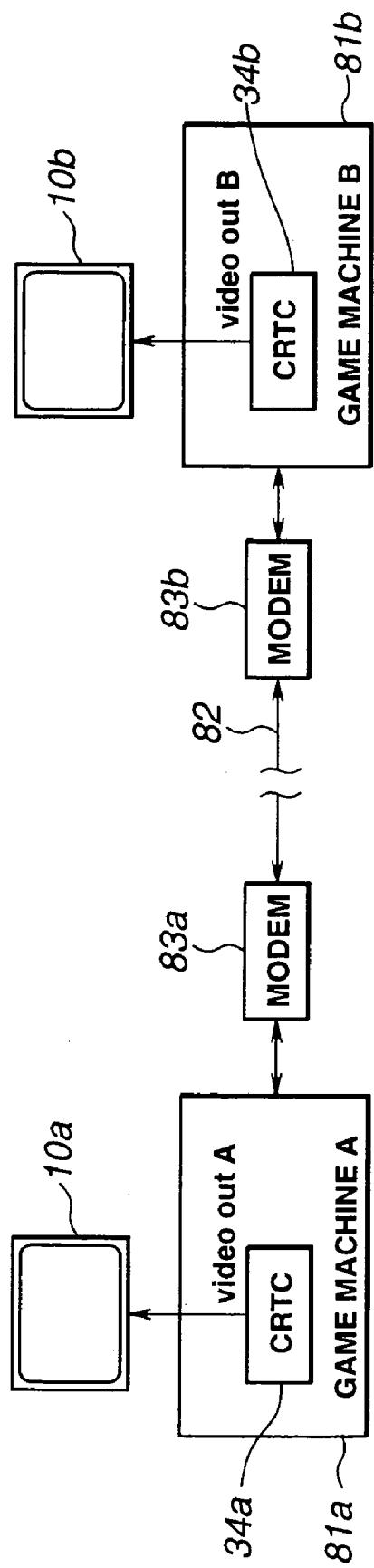
FIG. 3 shows an example of a conventional entertainment system in which two game playing machines are interconnected by a telephone network 82 to play a 1:1 combat game.
Figure 4:
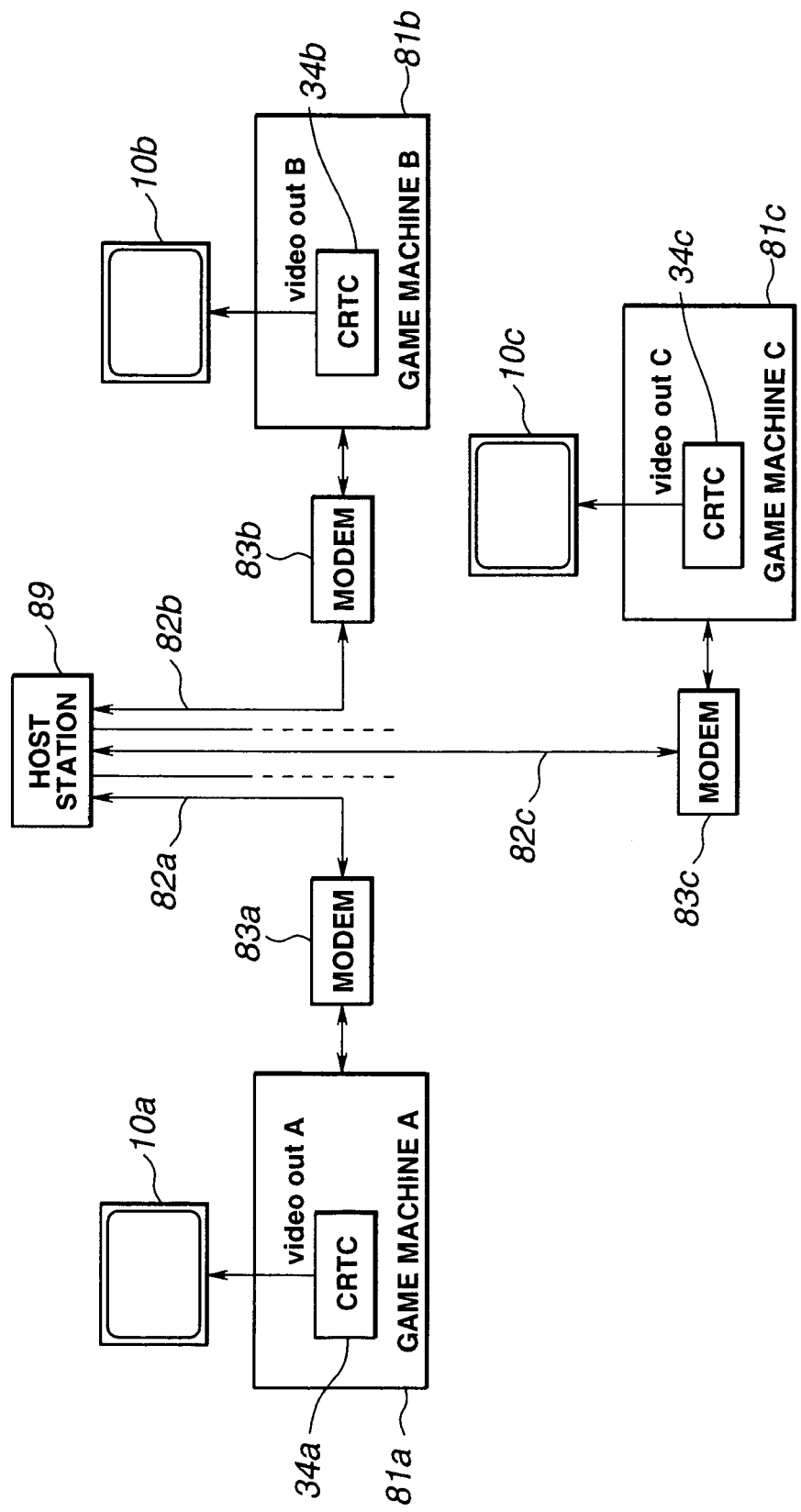
FIG. 4 shows an example of a conventional entertainment system in which three or more game playing machines are interconnected by a telephone network to play a combat game by plural participants.

The illustrative structure of the game playing apparatus of FIGS. 9 and 10 is similar to that of the conventional game playing apparatus shown in FIGS. 3 and 4, except that synchronization control is performed using the synchronization information sent from the satellite 90 in order to prevent picture signals displayed on the display units of the respective game playing machines from being significantly deviated from synchronization due to significant time delay produced in transmitting the status change information over communication cables 82 such as telephone networks.

Specifically, the respective game playing machines receive telecast signals, for example, sent from the satellite 90, via broadcast reception means 84*a*, 84*b*, 84*c*, made up of antennas or tuners, to detect the synchronization signals, such as telecast signals, transmitted form the satellite 90, in order to synchronize picture signals (video-out-A, video-out-B and video-out-C) outputted by the respective CRTCs 34*a*, 34*b* and 34*c*. It suffices if at least he synchronization signals are contained in the broadcast signals from the satellite, so that only synchronization signals can be aired. At this time, the respective game playing machines are frame-synchronized. However, frame numbers of the pictures may be made to coincide on the basis of the detected synchronization signals which represent the time information common to the game playing machines. The synchronization controlling method will be explained subsequently.

An embodiment of the synchronization controlling method according to the present invention, applied to the information equipments making up the information processing apparatus embodying the present invention, is hereinafter explained. It is assumed again that these information equipments are game playing machines each having the picture display apparatus embodying the present invention.

It is noted that, in exchanging status change information, such as game process change data, between the game playing machines, there is produced time delay due to use of the telephone network via communication modem (latency) so that coincidence of frame numbers of the pictures displayed on the display units of each game playing machine cannot be achieved without difficulties. For evading this inconvenience, fit is necessary to control the synchronization of the pictures displayed on the display units of the game playing machines in terms of one field (1/60 sec) or one frame (1/30 sec) of the picture signals as a unit, and to achieve coincidence of the frame numbers.

Figure 11:
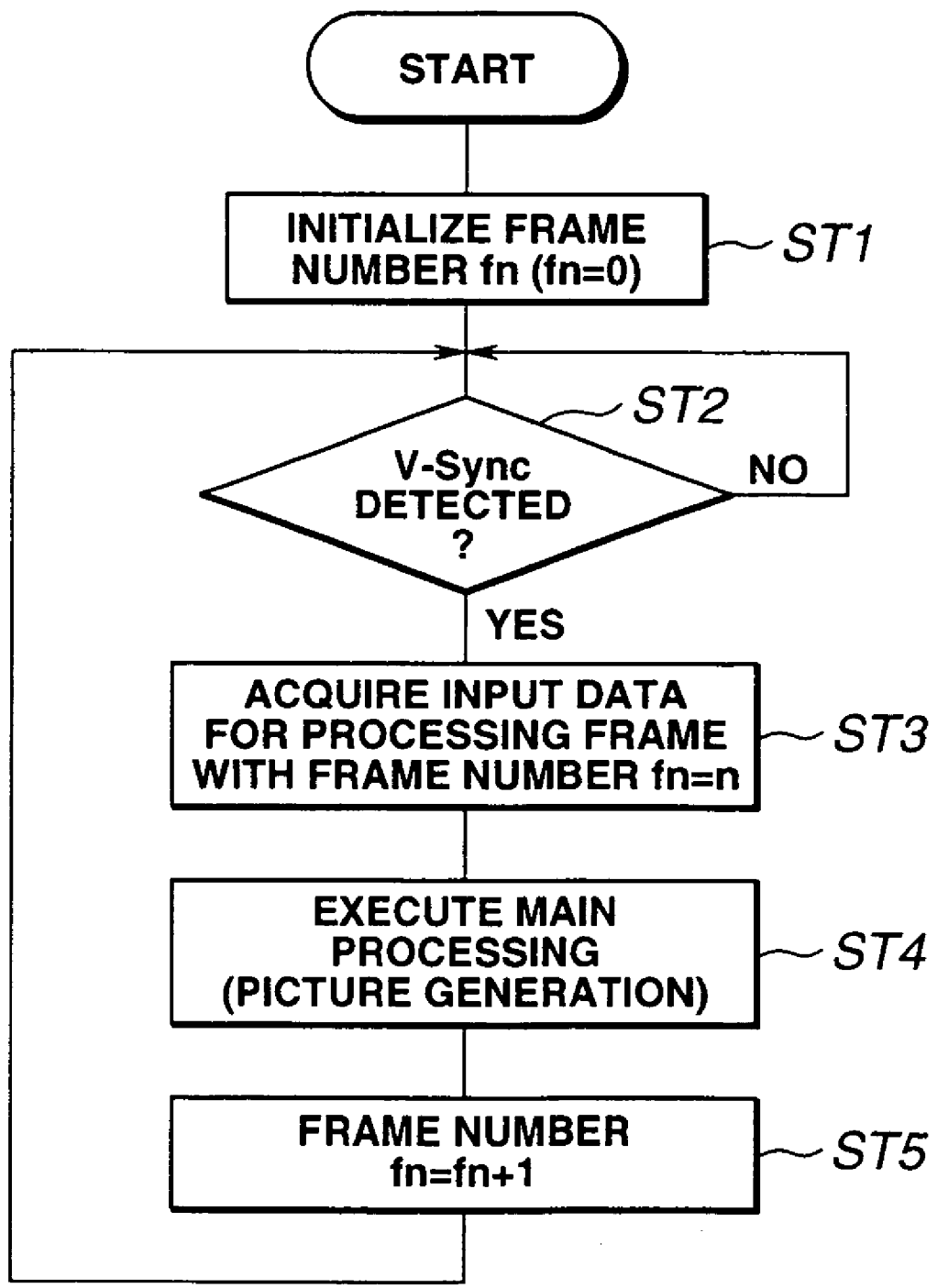
FIG. 11 is a flowchart for illustrating the basic processing sequence for the synchronization controlling method according to the present invention.

FIG. 11 shows a flowchart showing the synchronization control processing sequence when pictures are displayed in synchronism with the synchronization information entered from outside at the time of updating the pictures in real-time simultaneously with execution of an application program.

At step ST1, the frame number fn of picture signals to be synchronization-controlled is initialized, so that fn=0.

Then, at step ST2, inputting of the synchronization information from outside is awaited. On detection of the synchronization information, processing transfers to step ST3. As this synchronization information, the vertical synchronization signals (V-Sync) of the picture signals are used.

At step ST3, input picture data for processing picture signals of the frame having the frame number fn=0 is acquired.

At step ST4, the main program portion for generating a picture having the frame number fn equal to n from the picture data is executed, and the generated picture signals are outputted to a display unit.

At the next step ST5, the frame number fn is incremented by one to fn=n+1. Then, processing reverts to step ST2 to repeat the above process.

In the above-described processing of the main program portion in the synchronization control processing, the processing for a given frame, mainly the processing of generating a picture, comes to a close at the next vertical synchronization signal (V-Sync) in order to await the next vertical synchronization signal (V-Sync). With this controlling method, synchronization in the processing directly following the awaiting can be performed accurately even if the processing time is varied due to fluctuations in the load of the processing of the main program portion. It should be noted that the maximum processing time needs to be shorter than the frame time.

The processing for achieving coincidence of frame numbers fn of plural picture signals in the above-described synchronization control processing is further explained.

Figure 12:
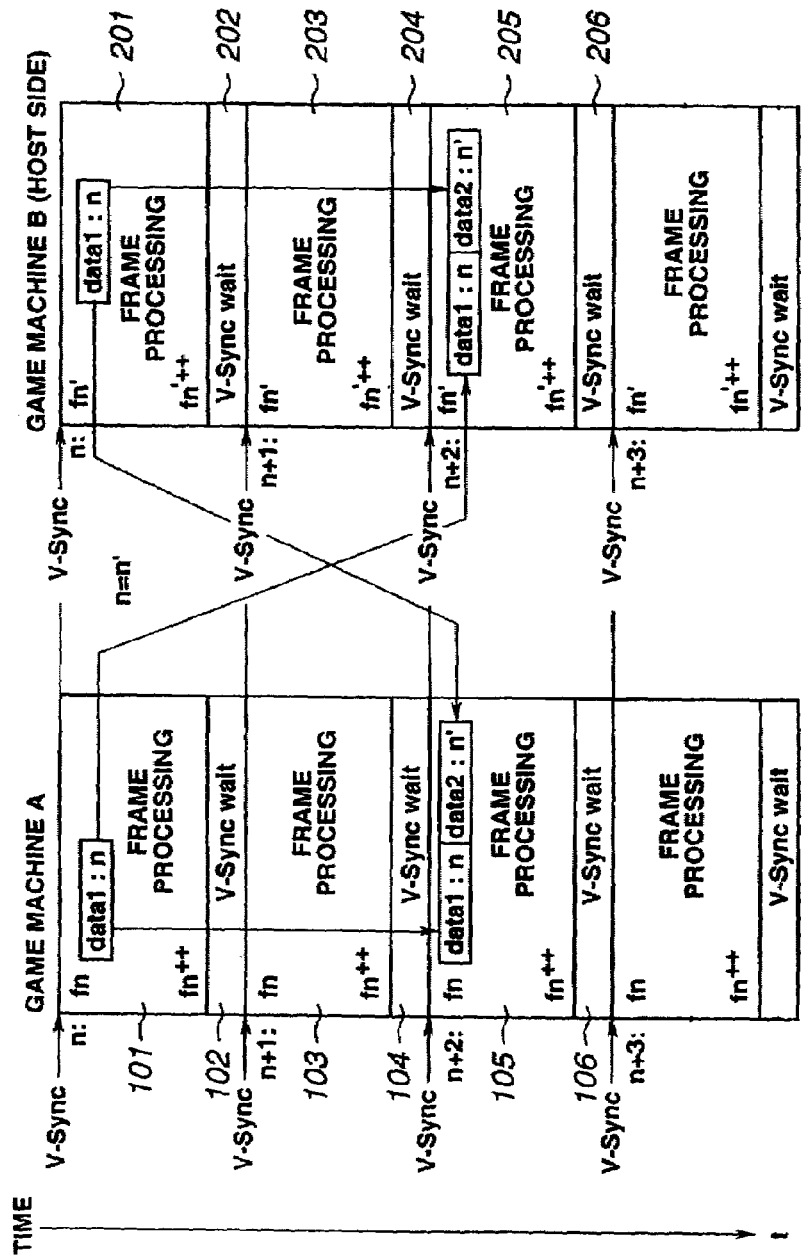
FIG. 12 illustrates an example of effecting synchronization control between information equipments by the synchronization controlling method according to the present invention.

FIG. 12 shows the state of synchronization control in case wherein two game playing machines each having a CRTC having the external synchronization function are synchronized with the common synchronization information, with the same frame counter values (frame numbers fn) being accorded to the frames occurring at the same time point t. it is assumed here that the game playing machine B is the host-side machine and that the game playing machine A is synchronized with the game playing machine B to generate pictures.

First, the frame number fn=n of picture signals processed by the game playing machine A and the frame number fn'=n' of picture signals processed by the game playing machine B are synchronized by, for example, reset signals, to the synchronization signal V-Sync as the common time information, so that n=n'. That is, by the common V-Sync, frame processing 101 on the game playing machine A and frame processing 201 on the game playing machine B are started simultaneously. Meanwhile, V-Sync described above is the vertical synchronization signal retrieved from telecast signals.

Although processing of the frame processing 101 is not necessarily equal to the frame processing 201, the next following frame processing 103 and frame processing 203 can be started simultaneously because there are provided awaiting time (V-Sync wait) 102, 202 until detection of the next V-Sync.

In frame processing 105, started after the awaiting time (V-Sync wait) 104, the game playing machine A processes data [data1:n], such as operating command obtained on the game playing machine A generated for the frame number fn=n or the status change information such as game process change data, and data [data2:n'], such as the status change information generated by the game playing machine B for the frame number fn'=n' and which is sent to the game playing machine A. Similarly, the game playing machine B processes, in the frame processing 205 started after the awaiting time (V-Sync wait) 204, the data generated by the game playing machine A after the waiting time (V-Sync wait) 204, the data [data1:n] generated by the game playing machine B at the frame number fn=n and sent to the game playing machine B, and the data [data2:n'] generated by the game playing machine B at the frame number fn'=n'. The same applies for the processing downstream of the waiting time 106 by the game playing machine A and the processing downstream of the waiting time 206 by the game playing machine B.

By transferring the input information indicating the frame number fn along with data (status change information), it becomes possible to realize coincidence of the frame numbers.

In this synchronization controlling method, the time delay (latency) in transferring picture data over the communication networks is LT, and i is the frame unit time when picture data is transferred over the communication networks. The input data for generating a frame having the frame number fn=n and data with the frame number fn=n−i entered i frame ahead of the above frame with the frame number fn=n and which is transferred from the counterpart side game playing machine represent input data for generating picture signals having the above frame number fn=n.

FIG. 12 shows the case for i=2. In generating a frame having the frame number fn=n+2 in the game playing machine A, picture signals are generated from data [data1:n], which is the data entered two frames before, and data [data2:n'], which is transferred from the counterpart game playing machine B with latency less than two frames.

With this synchronization controlling method, picture data transferred between two game playing machines can be synchronized to display the picture data on the display unit at the same time point.

Figure 13:
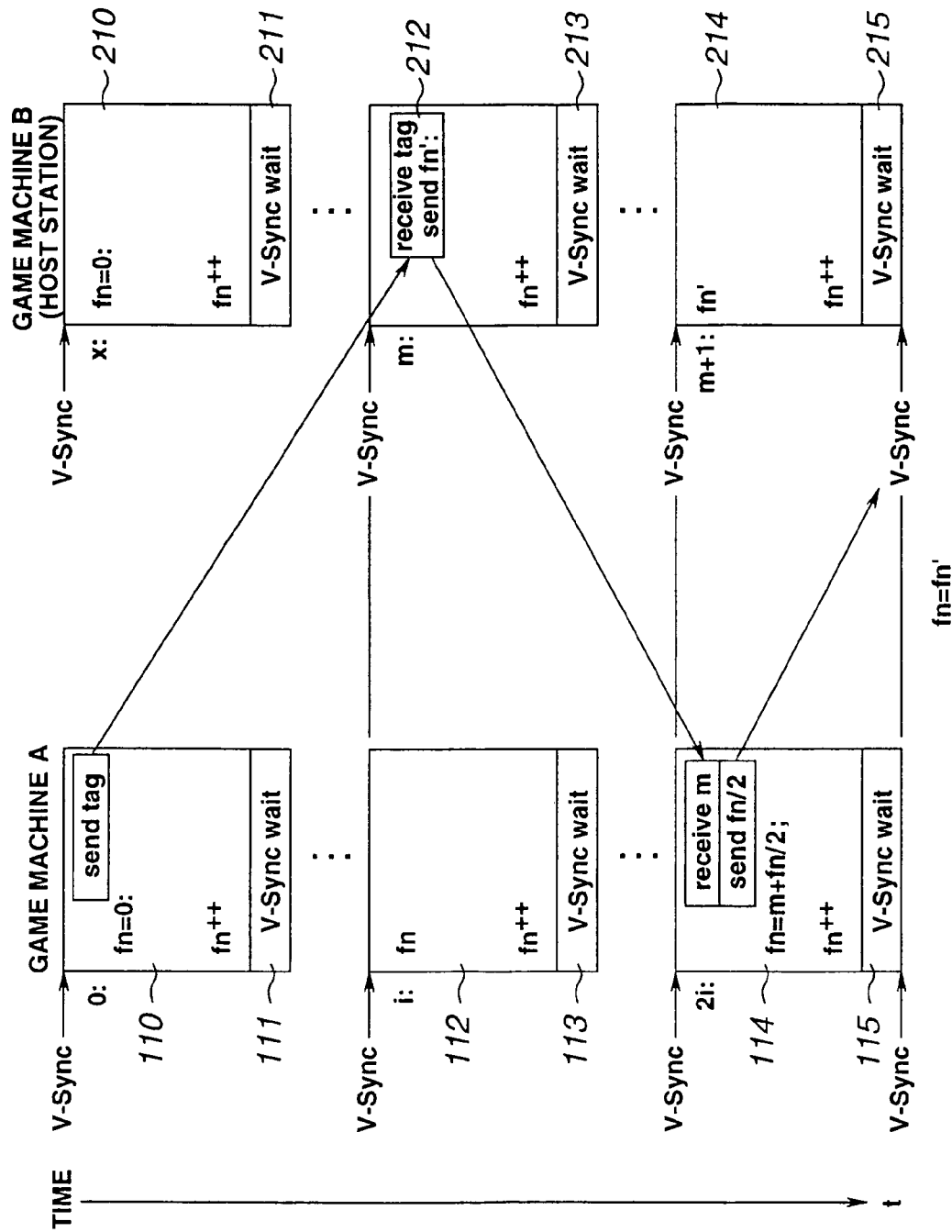
FIG. 13 illustrates an example of coincidence processing of frame numbers between information equipments interconnected by a telephone network via communication modem by the synchronization controlling method according to the present invention.

FIG. 13 shows the processing for achieving frame number coincidence between three or more different game playing machines interconnected via a communication modem over a telephone network and which is designed for playing a real-time game by plural participants. In the drawing, 110, 112, . . . denote frame processing by the game playing machine A, while 111, 113, . . . denote the waiting time in the game playing machine A. Similarly, 210, 212, . . . denote frame processing by the game playing machine B, while 211, 213, denote the waiting time in the game playing machine B.

In the synchronization controlling method, shown in FIG. 12, it is presupposed that the latency in transferring the status change information, such as game process change data between game playing machines, is not in excess of time corresponding to a pre-set number of frames. On the other hand, if each game playing machine transfers the status change information, such as game process change data, via communication modem, the transmission time delay (latency) cannot be determined. In this consideration, tags are sent along with data in response to which the frame numbers are returned.

Although the processing for achieving frame number coincidence between the game playing machines has been described above, the same applies for the processing for frame number coincidence between the game playing machines and the host station.

The synchronization controlling method according to the present invention, described above, uses the vertical synchronization signals of the telecast signals (V-Sync) as the synchronization information common to plural information equipments for synchronization of the information equipments on the picture signal level. With the present synchronization controlling method, data can be transferred with latency within one frame (1/30 second) or within one field (1/60 second) between the information equipments, while the values of the frame counts (frame numbers) can be synchronized easily.

Next, preferred embodiments of the information processing apparatus, applying the present invention as described above, are further explained.

Figure 14:
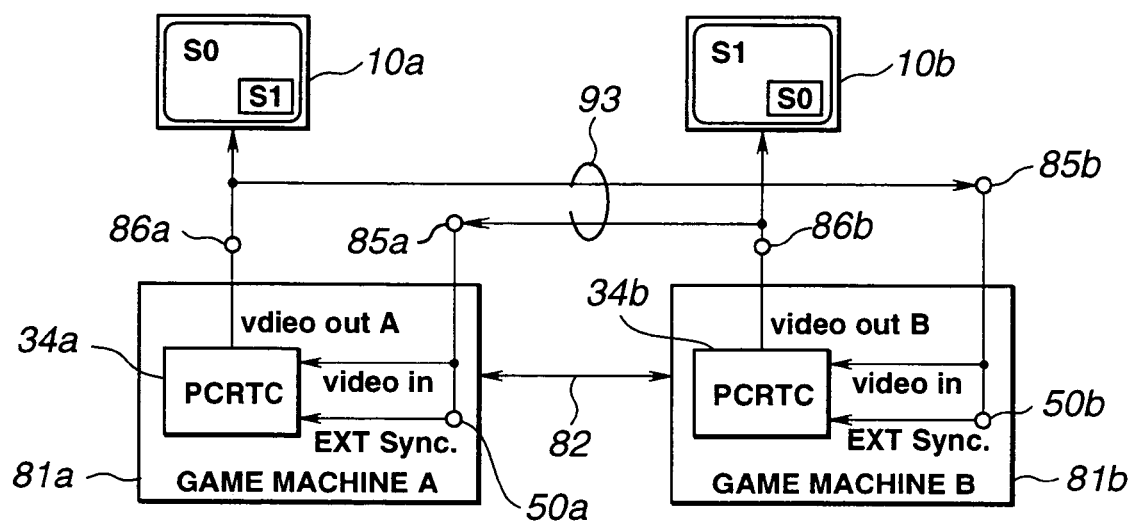
FIG. 14 shows an example of the structure of an entertainment system for playing a 1:1 combat game as an embodiment of the information processing apparatus of the present invention.

FIG. 14 shows an illustrative structure of a game playing machine (entertainment system) in which two game playing machines in close proximity to each other are interconnected over a communication cable for playing a 1:1 combat game.

In the entertainment system, shown in FIG. 14, the game playing machine B (81b) is the host side machine, while the game playing machine A (81a) generates picture signals sent from the game playing machine B to generate picture signals. In addition, picture signals themselves can be exchanged between the game playing machines A and B. That is, the communication cable 93 is a transmission channel for transmitting picture signals including synchronization signals between the game playing machines A and B. Meanwhile, the communication cable 82 is the status change information transmission channel for transmitting operating commands, speech, picture or status change information, such as game process change data, indicating the changes in the game process states, as described above.

The game playing machines 81a (game playing machine A) and 81b (game playing machine B) include picture input terminals 85a, 85b for inputting picture signals including synchronization signals. Input picture signals from these picture input terminals 85a, 85b are sent to the CRTCs 34a, 34b (in actuality, PCRTCs). The CRTCs 34a, 34b are each provided with synchronization information input terminals 50a, 50b, respectively, with the picture input terminal 85a of the game playing machine A being connected to the external synchronization information input terminal 50a of the CRTC 34a.

Thus, the game playing machine A receives the picture signals sent from the game playing machine B over the communication cable 93 at the picture input terminal 85a, while sending the synchronization information of the picture signals to the external synchronization information input terminal 50a. Thus, the game playing machine A outputs the picture signals (video-out-A) to the display unit 10a in synchronism with the picture signals sent from the game playing machine B.

On the other hand, the external synchronization information input terminal 50b of the game playing machine B, not supplied with the synchronization information from outside, outputs picture signals (video-out-B) at a picture output terminal 86b in accordance with the time information by internal clocks. On the other hand, picture signals from the game playing machine A are sent to the picture input terminal 85*b* of the game playing machine B.

By the above structure, the game playing machines can construct picture signals on the own machine using picture signals outputted by the counterpart side machine. Specifically, a picture S1 generated from picture data sent from the game playing machine B is displayed on the display unit 10*a* of the game playing machine A, in addition to a picture S0 generated on the game playing machine A. Similarly, the picture S0 generated from picture data sent from the game playing machine A is displayed, in addition to the picture S1 generated on the game playing machine B, on the display unit 10*b* of the game playing machine B.

Figure 15:
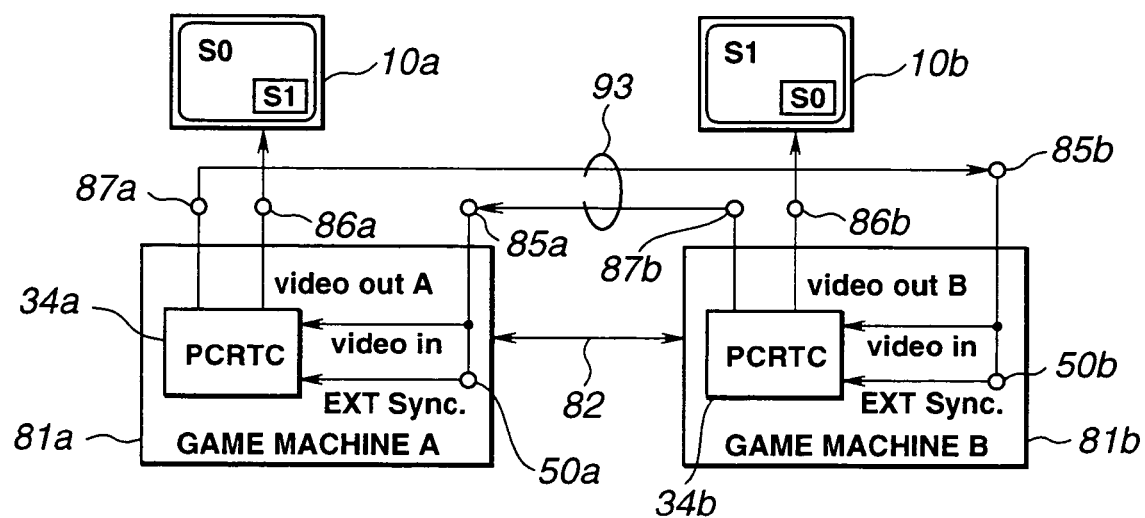
FIG. 15 shows another example of the structure of an entertainment system for playing a 1:1 combat game as an embodiment of the information processing apparatus of the present invention.

FIG. 15 shows another illustrative structure of a game playing machine (entertainment system) in which two game playing machines in close proximity to each other are interconnected over a communication cable for playing a 1:1 combat game. In the entertainment system, the game playing machine B is the host side machine, while the game playing machine A (81*a*) generates picture signals sent from the game playing machine B to generate picture signals.

The structure of the present entertainment system is similar to the structure shown in FIG. 14, except that, in addition to picture signals for monitoring on the own equipment, picture signals for other equipments are also sent. This structure is advantageous when desired to exploit the texture information or the background picture information between the game playing machines.

In the entertainment system of FIG. 15, the CRTCs (in effect, PCRTCs) 34*a*, 34*b* of the game playing machines A and B are provided with picture output terminals 87*a*, 87*b*, respectively, adapted for outputting picture signals for other than the own game playing machine, in addition to picture output terminals 86*a*, 86*b* for monitoring on the own game playing machine, so that picture signals from the picture output terminal 87*a* of the game playing machine A will be transmitted to the picture input terminal 85*b* of the game playing machine B, and so that picture signals from the picture output terminal 87*b* of the game playing machine B will be transmitted to the picture input terminal 85*a* of the game playing machine A. This entertainment system is otherwise the sane in structure to the system of FIG. 14 described above and hence the same reference numerals are used to depict the corresponding parts to avoid redundant description.

Figure 16:
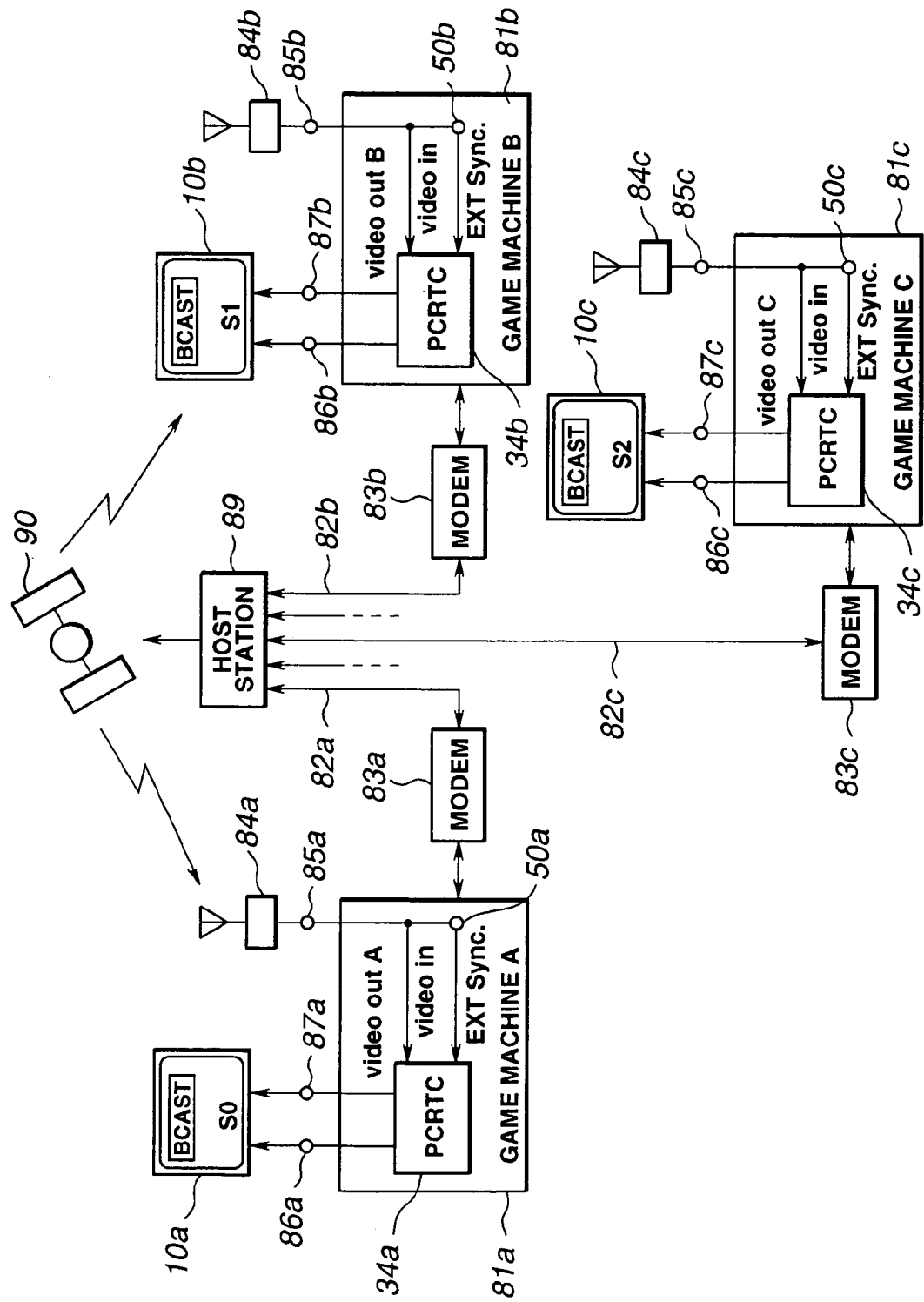
FIG. 16 shows an example of the structure of an entertainment system for playing a real-time game by plural participants over a telephone network.

FIG. 16 shows an illustrative structure of a game playing apparatus (entertainment system) in which plural game playing machines are at remote positions from one another and the game is played as the status change information such as game process change data is exchanged via communication modems over a telephone network, or in which picture signals are supplied simultaneously with the synchronization signals by a satellite 90. Although FIG. 16 illustrates an entertainment-system made up of three game playing machines, the number of the game playing machines can be increased or decreased, if so desired.

The game playing machines 81*a* (game playing machine A) to the game playing machines 81*c* (game playing machine C) are similar to the game playing machines shown in FIGS. 14 and 15 and are operated under control by the host station 59. This entertainment system is otherwise the sane in structure to the system of FIGS. 14, 15 or 10 described above and hence the same reference numerals are used to depict the corresponding parts to avoid redundant description.

The game playing machines A to C are provided with broadcast reception means 84*a*, 84*b* and 84*c*, such as antennas or tuners, for receiving television signals sent from the satellite 90 to detect the synchronization signals which are used as the common time information for synchronizing the picture signals video-out-A, video-out-B and video-out-C. With the above-mentioned game playing machines, frame synchronization is achieved by coincidence of frame numbers contained in the data transmitted from other game playing machines. This synchronization controlling method is as described above.

With the above-described structure, it becomes possible to realize a game for plural participants by the plural game playing machines co-owning the real-time picture information by a host station 89 sending dedicated broadcast to the satellite 90. Since the frame number information can be appended to the picture signals sent from the satellite 90 for transmission, the above-described frame number coincidence processing can be omitted.

A preferred embodiment of the picture display apparatus having the above-mentioned CRTC or PCRTC according to the present invention is hereinafter explained. The picture display apparatus according to the present invention is preferably used for an information equipment constituting the information processing apparatus embodying the present invention. In the following description, a game playing machine is assumed to be used as an illustrative example of the picture display apparatus.

Figure 17:
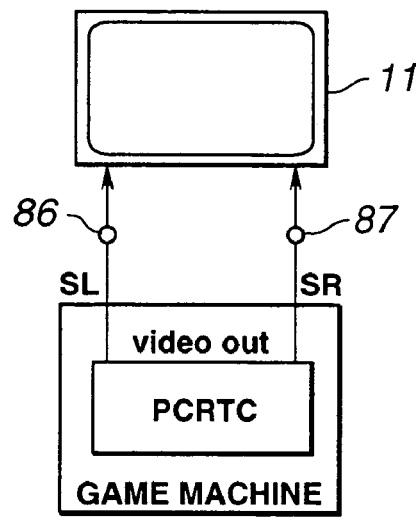
FIG. 17 illustrates a game playing machine for coping with stereo display constructed using the picture display apparatus of the present invention.

FIG. 17 shows a game playing machine for stereo display in which pictures for right eye and left eye with different parallax are drawn on different areas of the video memory so that the PCRTC 34 displays left and right independent picture signals on the display unit 11. The video memory is not shown.

The PCRTC 34 of the game playing machine 91 has, in addition to the conventional picture output terminal 86, a picture output auxiliary terminal 87 as a separate picture output terminal. Left and right independent picture signals can be displayed on the display unit 11 by outputting picture signals SL for left eye and picture signals SR for right eye at the picture output terminal 86 and at the picture output auxiliary terminal 87, respectively.

Figure 18:
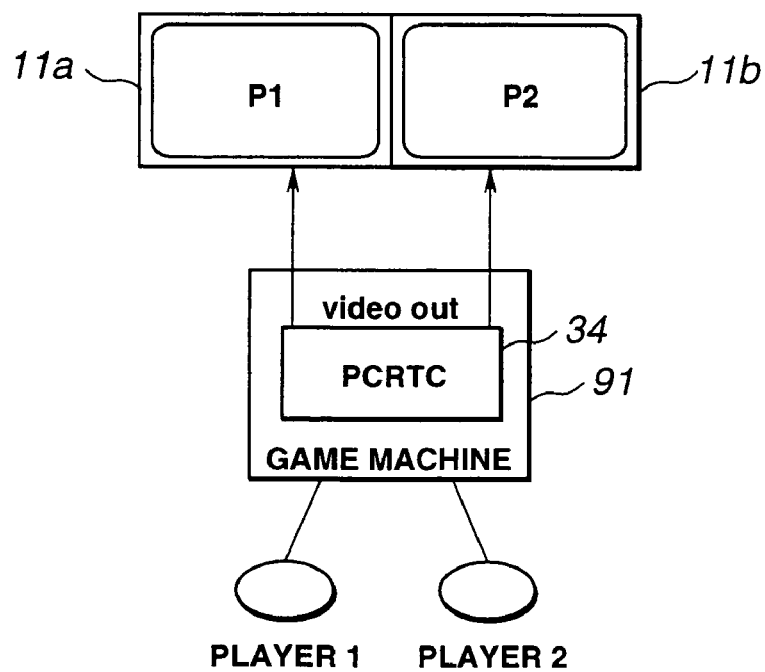
FIG. 18 illustrates a two full picture combat game playing machine constructed using the picture display apparatus of the present invention.

FIG. 18 shows an example of a two full-picture combat game constructed by the PCRTC 34 having the picture output terminal 86 and at the picture output auxiliary terminal 87. This game playing machines 91 is configured so that pictures for two combatting players P1, P2 are independently drawn on different areas of the video memory for representation on the display devices 11*a*, 11*b*, respectively.

Figure 19:
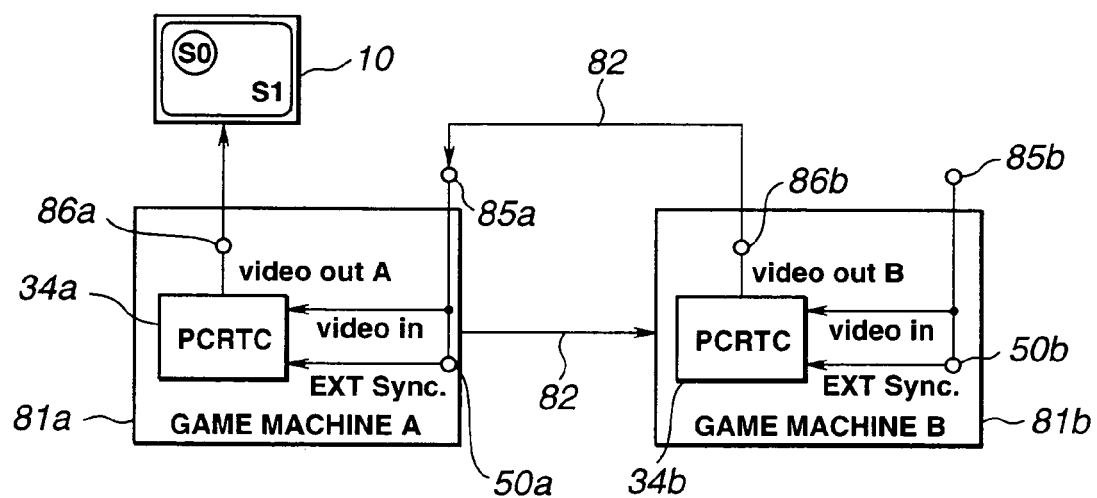
FIG. 19 illustrates an example of the structure of an entertainment system in which the load of picture generation by the game playing machine is distributed by co-owning the information of picture data generated by a given game playing machine.

FIG. 19 shows an illustrative structure of a game playing machine in which the information of picture data generated by a given game playing machine is inputted to another game playing machine which then exploits the input data to generate a new picture.

The game playing machines A and B are configured similarly to the above-described game playing machine. The game playing machine A directly exploits the picture S1 generated by the game playing machine B as a background picture to synthesize the picture S0 generated by the game playing machine A to the picture S1 for representation on the display unit 10. That is, by co-owning the data of the background picture, produced in common to the game playing machines A and B, it becomes possible to distribute the picture generating load between the game playing machines A and B. Although only two game playing machines are shown, three or more game playing machines can similarly be connected in series to construct the game playing machine.

In the above-described embodiment of the present invention, a game playing machine is taken as an example of an information equipment having the picture display apparatus. The present invention, however, can be broadly applied to an information processing apparatus adapted for real-time information representation on a display unit based on the exchanged picture data.

Moreover, the game playing machine having the enclosed CRTC (PCRTC) used in the embodiments of the invention can retrieve pictures synchronized on the picture level so that the picture information in the combat by communication at proximate separation can be exchanged or re-utilized in real-time. In addition, the picture information can be delivered in real-time using the TV broadcast, while it is possible to construct a real-time game by plural participants and the program co-owning the real-time picture information in combination with the communication networks. In addition, load distribution, two-screen combat or stereo display is enabled by exploiting the CRTC (PCRTC) function.

What is claimed is:

1. An entertainment system in which plural entertainment devices are interconnected via a communication channel,
    wherein said plural entertainment devices are interconnected via a synchronization signal transmission channel and a status change information transmission channel;
    and wherein at least one of said entertainment devices outputs picture signals in synchronism with synchronization signals transmitted from the entertainment device other than said at least one entertainment device via said synchronization signal transmission channel, based on status change information of said at least one entertainment device and status change information sent from the other entertainment device, said synchronization signal being a synchronization signal component contained in picture signals of the other entertainment device.

2. The entertainment system according to claim 1 comprising:
    a memory in which picture data is written, and
    display control means having a synchronization signal input terminal to which are entered synchronization signals from outside, sent over said synchronization signal transmission channel,
    said display control means having the function of outputting as picture signals picture data written in said memory in synchronism with said synchronization signals from outside.

3. The entertainment system according to claim 2,
    wherein there are recorded in said memory picture data generated on the basis of the own status change information and picture data generated on the basis of the status change information sent from the other entertainment device over said synchronization signal transmission channel.

4. The entertainment system according to claim 2 wherein said display control means brings the frame numbers of the picture signals into coincidence using said synchronization information signals for achieving frame synchronization.

5. The entertainment system according to claim 2 wherein said display control means further includes a picture input terminal to which picture signals from outside are entered and has the function of writing the input picture signals in said memory.

6. An entertainment system according to claims 1 or 2, wherein
    said picture signals of the other entertainment device are signals for displaying video in a display unit connected to said other entertainment device.

* * * * *